(12) United States Patent
Drepper et al.

(10) Patent No.: US 11,347,490 B1
(45) Date of Patent: May 31, 2022

(54) COMPILATION FRAMEWORK FOR HARDWARE CONFIGURATION GENERATION

(71) Applicant: Red Hat, Inc., Raleigh, NC (US)

(72) Inventors: Ulrich Drepper, Grasbrumn (DE); Ahmed Sanaullah, Boston, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/126,988

(22) Filed: Dec. 18, 2020

(51) Int. Cl.
*G06F 8/41* (2018.01)
*G06N 20/00* (2019.01)

(52) U.S. Cl.
CPC ............... *G06F 8/47* (2013.01); *G06N 20/00* (2019.01)

(58) Field of Classification Search
CPC ......................................................... G06F 8/41
See application file for complete search history.

(56) References Cited

U.S. PATENT DOCUMENTS

| | | | |
|---|---|---|---|
| 2003/0086300 A1 | 5/2003 | Noyes et al. | |
| 2004/0088685 A1* | 5/2004 | Poznanovic | G06F 8/447 717/140 |
| 2007/0061018 A1* | 3/2007 | Callaghan | G05B 19/05 700/1 |
| 2016/0291942 A1* | 10/2016 | Hutchison | G06F 8/34 |

OTHER PUBLICATIONS

Danis et al., "LegUp: An Open-Source High-Level Synthesis Tool for FPGA-Based Processor/Accelerator Systems", ResearchGate, Sep. 2013, 26 pages.
Friebe et al, "Enabling FPGAs for Software Developers", Intel Corporation, Oct. 2017, 6 pages.

* cited by examiner

*Primary Examiner* — Jae U Jeon
(74) *Attorney, Agent, or Firm* — Lowenstein Sandler LLP

(57) ABSTRACT

Systems and methods for supporting a compilation framework for hardware configuration generation. In one implementation, a processing device executing a compilation workflow for a target architecture may receive an input source code associated with a configuration for the target hardware architecture; identify a first configuration information associated with at least a portion of the configuration for the target hardware architecture; perform a first set of compilation passes of the input source code in view of the first configuration information; generate, in view of the first set of compilation passes of the input source code, a first internal representation component for the target hardware architecture; and generate, in view of the first internal representation component, a binary bitstream component for the target hardware architecture.

20 Claims, 8 Drawing Sheets

COMPILATION FRAMEWORK FOR HARDWARE CONFIGURATION GENERATION

TECHNICAL FIELD

The present disclosure is generally related to computer systems, and more particularly, to a compilation framework for hardware configuration generation in computer systems.

BACKGROUND

A field-programmable gate array (FPGA) is an integrated circuit designed to be configured by a customer or a designer after manufacturing. The FPGA configuration is typically specified using a Hardware Description Language (HDL), similar to that used for an application-specific integrated circuit (ASIC). FPGA configuration can be managed using electronic design automation tools that work together in a design workflow that chip designers can use to design and analyze entire semiconductor chips.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
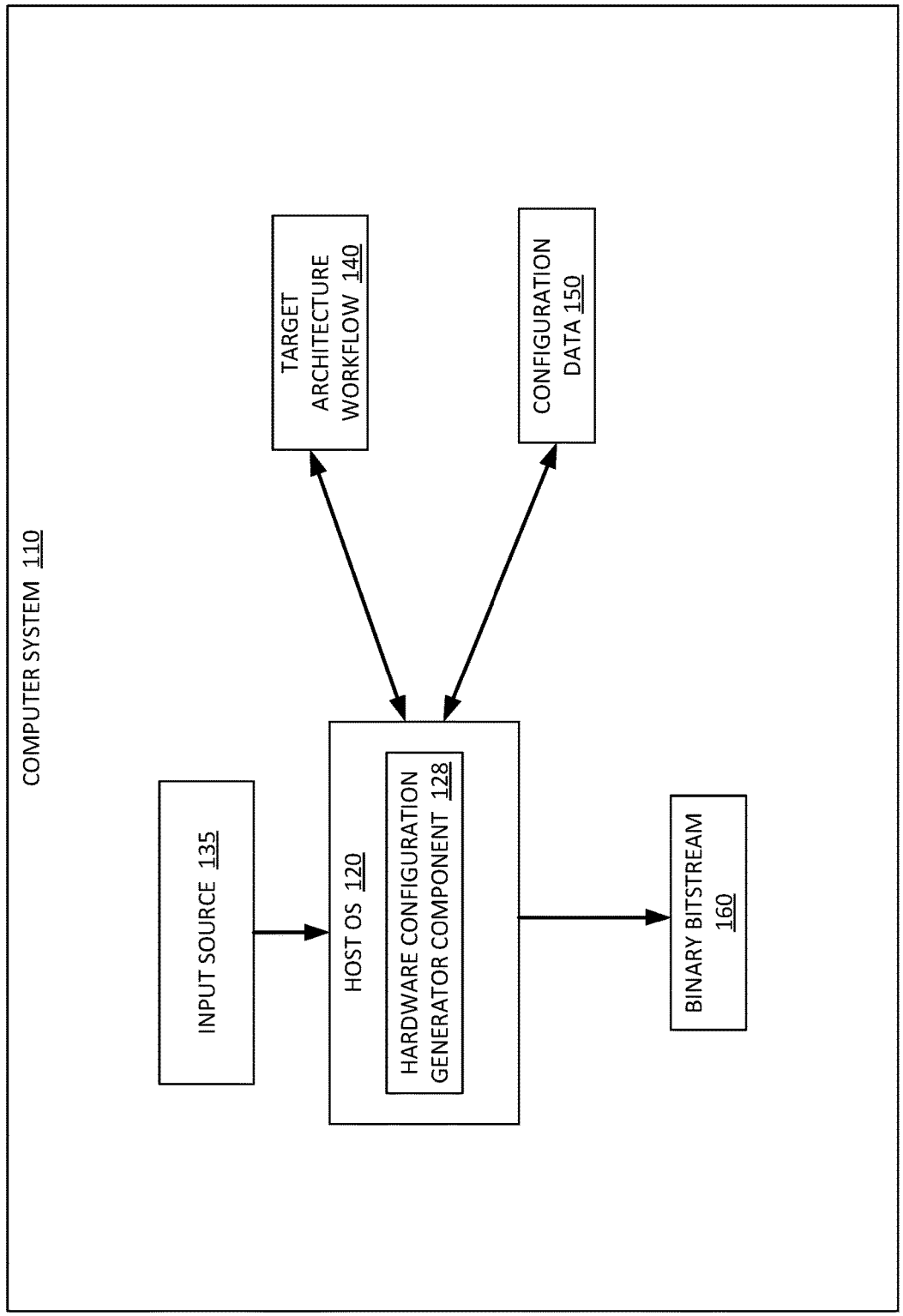
FIG. 1 depicts a high-level diagram of an example system architecture operating in accordance with one or more aspects of the present disclosure.

Described herein are methods and systems for facilitating a compilation framework for hardware configuration generation.

In conventional hardware, integrated circuits are implemented on a chip. With these types of implementations, the circuits are baked into the chip, and therefore are typically fixed after manufacturing. With these chips, a user can develop software that loads onto a chip and execute functions. With an FPGA, the user programs the hardware circuits that can involve one or more complex functionalities that can act as a comprehensive processor. FPGAs can contain an array of programmable logic blocks, and a hierarchy of configurable connections that allow the blocks to be coupled or "wired" together. Logic blocks can be configured to perform various functions, including, but not limited to, complex combinational functions, sequential logic, buffers, phased locked loops (PLLs) with digital and analog components, or simple logic gates such as AND gates and XOR gates.

FPGAs can be valuable computing platforms for a variety of implementations, including both data center and edge computing platforms. These types of hardware implementations can provide an effective blend of high performance, low power profile coupled with generalized applicability that cannot be readily achieved with alternative technologies. In conventional systems, hardware configuration generation can be performed by starting with high level language (HLL) code (e.g., C, C++, python, etc.). This code can then be translated into a target/vendor specific hardware description language (HDL) code, a process referred to as High Level Synthesis (HLS). Alternatively, a developer can start directly with HDL code. The HDL code is converted into a logical netlist through a process called Synthesis. A logical netlist can specify the various FPGA components used to construct the circuit (e.g., look up tables, flip flops, etc.) and how these components are connected. The logical netlist can then be converted to a physical netlist using a process called Place and Route, which involves mapping components in the logical netlist to physical resources on the target architecture (e.g., target chip structure), and using the target's reprogrammable interconnect to couple these components together. The physical netlist is then converted to a binary code using a process called bitstream generation, that maps the physical netlist to the specific bits in the chip's configuration memory that is to be set in order to create and initialize the target circuit.

While conventional systems that implement tools in this way provide the ability for developers to implement circuitry for FPGAs based on HLL or HDL source, these types of frameworks have many deficiencies and lag far behind those tools available for software development. In particular, the three phases mentioned above are disjointed and do not share information readily with each other, leading to inefficiency in the compilation process as well as a lack of portability of both the individual compilation stages (e.g., tools) and the objects/binaries/internal representations generated by each stage. Additionally, the amount of reuse of derived information (e.g., using the same source construct in multiple stages) is severely limited, leading to increases in turn-around time for development and optimization iterations as well as low performance of the resulting binary. Moreover, since information is not shared readily between the phases, between the different tools within a phase, or between different executions of the phases, the ability to control the compilation process as well as the ability to customize the workflow are both severely limited.

Aspects of the present disclosure address the above noted and other deficiencies by implementing technology to facilitate a compilation framework for hardware configuration generation. In various implementations, aspects of the present disclosure bridge the gap between hardware and software development tools by configuring a compilation workflow that leverages software development techniques. The workflow can be configured as a series of compilation passes that operate using intermediate representations and data interchange file formats to produce a final binary bitstream. The compilation process incorporates features of the three phases (Synthesis, High Level Synthesis, and Place and Route) in a repeatable, reorderable and modifiable set of compiler passes. Additionally, configuration information can be injected into any of the workflow stages in order to direct the compilation process of that stage to improve the efficiency of that stage as well as the reliability of the object/internal representation produced by the stage. This configuration information can be provided by the output of previous compiler stages within the same workflow as well as from previous executions of the same or different workflows.

In one implementation, a hardware configuration generator component can receive input source (HLL or HDL) associated with the configuration of a target hardware architecture (e.g., FPGA circuitry). The hardware configuration generator component can identify configuration information associated with a portion of the target hardware architecture. In various implementations, this configuration information can include algorithmic representations of functionality for the FPGA (or other architecture) circuitry as well as machine learning models that can direct the compilation passes of a particular compilation stage. The hardware configuration generator component can then perform a set of compilation passes of the input source using the injected configuration information and generate an internal representation for the workflow stage. Multiple workflow stages can be executed, each receiving configuration information to direct that stage, until a final binary bitstream component is generated for the FPGA circuitry.

In another implementation, a hardware configuration generator component can receive an input source associated with the configuration of a target hardware architecture (e.g., FPGA circuitry). In this implementation, the hardware configuration generator component can retrieve configuration information from a previous workflow execution to direct one or more compilation stages of the current workflow. In particular, this embodiment can analyze differences between current versions of source, object, binary, or internal representation components to previous versions to identify changes, and configure the compilation passes and/or workflow stages based on the determined differences. Additionally, the hardware configuration generator component can link the source, object, binary, or internal representations from a previously executed workflow to a currently executing workflow, incorporating design information to the current workflow.

Aspects of the present disclosure present advantages over conventional solutions to the issues noted above. First, since the entire compilation process is structured as repeatable, reorderable, and modifiable compiler passes, the boundaries for the compilation process are more fluid. For example, technology independent optimization passes that are typically performed in the Synthesis phase can now be performed after some Place and Route passes which add technology specific information to an intermediate representation. Additionally, the data and control flow graphs can be optimized to bypass some unnecessary workflow stages, and can be directly translated into a logical netlist without generating HDL. The process of generating HDL is inefficient, since information is typically lost when creating HDL from HLL code (due to limitations and/or abstractions of HDL), which is often needed by later stages of the workflow. Thus, by connecting the different phases together and injecting configuration information into various stages, more information is preserved for reuse in later stages, which dramatically improves performance of the overall compilation process as well as the reliability and performance of the final generated binary bitstream. Moreover, removing unnecessary workflow stages can also speed up the process. Additionally, the ability to reuse configuration from the current or previous workloads can reduce turnaround times for the compilation FIG. 1 depicts an illustrative architecture of elements of a host computer system 110, in accordance with an embodiment of the present disclosure. It should be noted that other architectures for host computer system 110 are possible, and that the implementation of a computer system utilizing embodiments of the disclosure are not necessarily limited to the specific architecture depicted by FIG. 1. Host computer system 110 may comprise one or more processors communicatively coupled to memory devices and input/output (I/O) devices. Host computer system 110 runs a host operating system (OS) 120, which can comprise software that manages the hardware resources of the computer system and that provides functions such as inter-process communication, scheduling, virtual memory management, and so forth.

Host OS 120 may additionally include a hardware configuration generator component 128 to facilitate a compilation framework for hardware configuration generation. In some implementations, hardware configuration generator component 128 can receive an input source 135 and execute the compilation stages of target architecture workflow 140 using the input source 135 to generate binary bitstream component 160. As described in further detail below, at various compilation stages of target architecture workflow 140, hardware configuration generator 128 can receive configuration data 150 to direct various aspects of the compilation transformation passes executed during each stage of the workflow 140.

In some implementations, input source 135 can be source code that includes instructions associated with the target architecture. As noted above, in some implementations, the target architecture can be an FPGA circuitry architecture. In other implementations, the target architecture can be another hardware architecture (e.g., ASIC). In various implementations, the input source 135 can be HLL source code, HDL source code, or the like. Hardware configuration generator component 128 can detect the type of source code included in input source 135 and execute the target architecture workflow 140 at an appropriate starting point compilation stage based on the type of source code in input source 135. For example, if the input source 135 is HLL, then hardware configuration generator component 128 can initiate an initial stage of a High Level Synthesis phase of the workflow 140 to generate technology independent and/or technology dependent internal representations. In contrast, if the input source 135 is HDL, then the initial stages of the workflow may be bypassed to proceed to a stage in a Synthesis phase of the workflow that generates a logical netlist from the HDL code.

At each compilation stage of the workflow 140, hardware configuration generator component 128 can receive additional configuration information (e.g., configuration data 150) to inform and/or direct the compilation passes for that stage of the workflow. In various implementations, configuration data 150 can include algorithmic representations of functionality performed by the target hardware architecture, information describing changes in the source code or internal representation component in relation to a previous version, or data representing a machine learning model (e.g., an identifier of a machine learning model and configuration parameters for the machine learning model) that can regulate the compilation passes. Notably, in various implementations, configuration data 150 can be configured in a self-describing format such that any changes can be made dynamically without reconfiguring and/or recompiling hardware configuration generator component 128. Thus, new configuration data 150 can be added to the process seamlessly without disrupting the execution of the workflow.

In some implementations, configuration data 150 can be generated and stored separately from workflow 140. In other words, configuration information associated with functionality that is common across various workflow can be stored in configuration data 150 and used in multiple workflows. For example, logic associated with a matrix multiplication operation can be stored in configuration data 150 so that it can be accessed by any compilation stage within any workflow. Additionally, configuration data 150 can be generated as output by various stages of a workflow that can be used by later stages of that workflow.

In some implementations, hardware configuration generator component 128 can retrieve configuration data 150 generated by one workflow to be used to direct the execution of a different workflow or a subsequent execution of the same workflow. For example, a subsequent execution of a particular workflow can access configuration information that describes changes to source and/or internal representations to control and direct the compiler passes in a particular stage. For example, if a particular portion of input source (or a particular portion of an internal representation component generated by an intermediate workflow stage) includes significant amount of changes, then hardware configuration generator component 128 can determine that additional compiler passes shall be executed or additional stages of the workflow shall be executed. Similarly, if the configuration data 150 indicates minimal differences between the versions, hardware configuration generator component 128 can reduce the number of compilation passes and/or bypass subsequent compilation stages if the changes do not have an effect on the result.

Hardware configuration generator component 128 is described in further detail below with respect to FIGS. 2-5.

Figure 2:
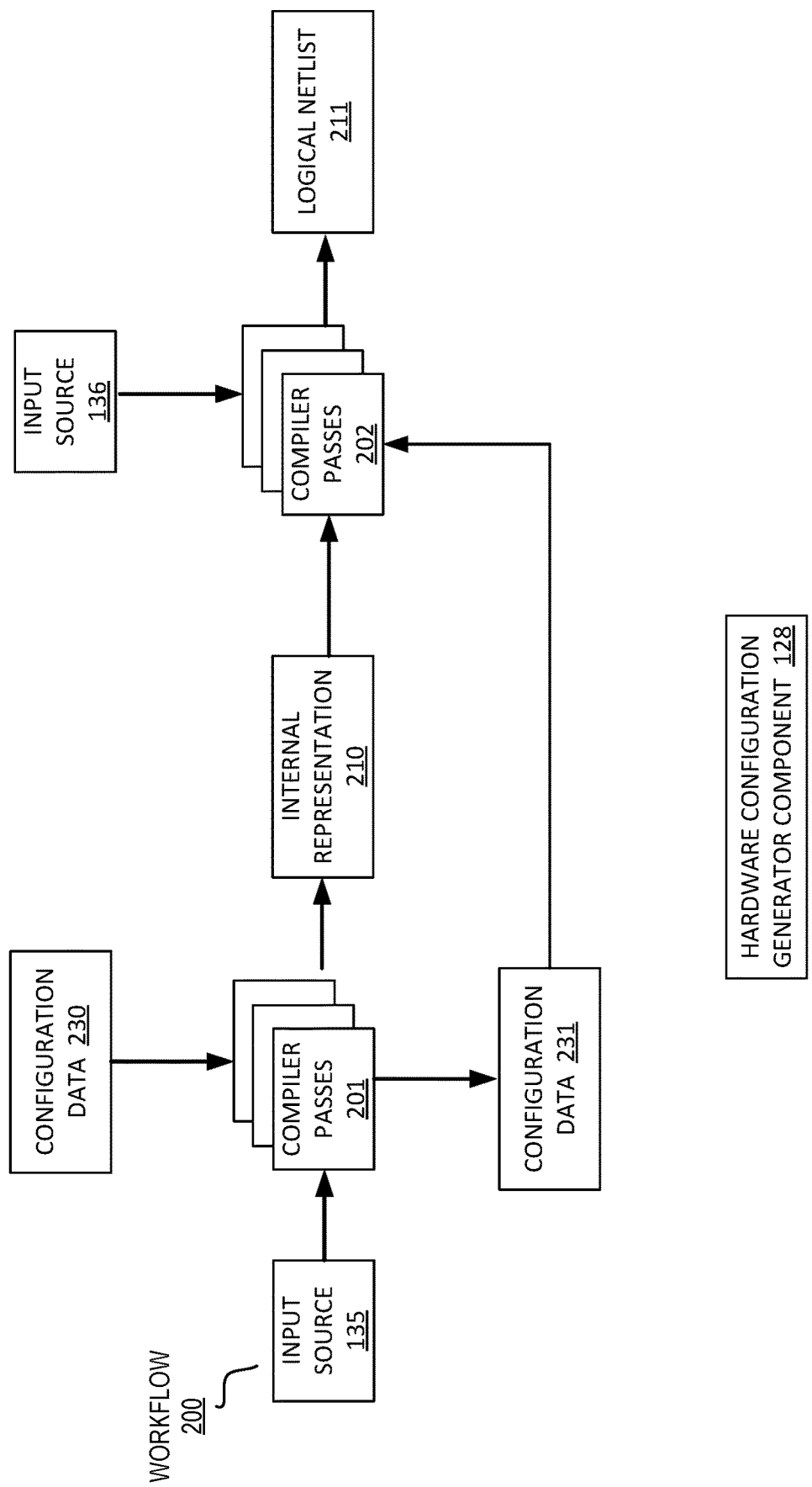
FIG. 2 depicts an illustration of a hardware configuration generation workflow that utilizes configuration data, in accordance with one or more aspects of the present disclosure.

FIG. 2 depicts an illustration of a hardware configuration generation workflow that utilizes configuration data, in accordance with one or more aspects of the present disclosure. As shown in FIG. 2, hardware configuration generator component 128 is invoked to execute a workflow 200 that can include multiple compilation phases to transform input source into a binary bitstream component. It should be noted that for ease of illustration, workflow 200 depicts two compilation stages (compiler passes 201, 202) that generate two internal representation components within the workflow 200 (internal representation 210, logical netlist 211), but in other implementations workflow 200 can include more compilation stages that produce additional internal representation components within the workflow to produce a resulting binary bitstream component for a target hardware architecture (e.g., FPGA circuitry).

As shown in FIG. 2, hardware configuration generator component 128 can receive input source 135 and initiate workflow 200. In an illustrative example, input source 135 can include HLL source code, which can cause hardware configuration generator component 128 to begin execution of the workflow 200 from the beginning of the High Level Synthesis phase to generate in internal representation (IR) 210 (e.g., a technology independent IR, technology dependent IR, etc.). As shown, hardware configuration generator component can receive configuration data 230 as input to the first compilation stage (compiler passes 201) to generate the IR 210. As described above, the configuration data 230 can be a self-describing data file that can include algorithmic representation of a functionality associated with the target hardware configuration, data representing a machine learning model, or other information that can be used to direct the execution of compiler passes 201.

The execution of the first compilation stage 201 can generate internal representation 210 which is forwarded to the next stage of the workflow (e.g., compiler passes 202). As shown, compiler passes 201 can also generate additional configuration data (e.g., configuration data 231) that can be used by subsequent compilation stages within workflow 200. As shown, configuration data 231 is used as additional input to the next compilation stage of workflow 200. Although for simplicity, configuration data 231 is used as input to the next stage in the workflow, in other implementations, configuration data 231 can be used in stages of workflow 200 that occur later in the workflow. Alternatively, configuration data 231 may not be used again in workflow 200.

As shown, the second compilation stage (compiler passes 202) generates logical netlist 211. As noted above, workflow 200 can include additional stages after the generation of logical netlist 211 to generate a resulting binary bitstream component for the target hardware architecture. In some implementations, hardware configuration generator component 128 can initiate workflow 200 at different starting point stages based on the type of input source received. For example, input source 135 may be HLL source, in which case hardware configuration generator 128 can initiate the workflow at an earlier compilation stage. In contrast, hardware configuration generator 128 can receive input source 136, and initiate the workflow at a later stage if appropriate. For example, if input source 136 is HDL code, then the generation of internal representation 210 can be bypassed to execute compiler passes 202 for generation of logical netlist 211.

Figure 3:
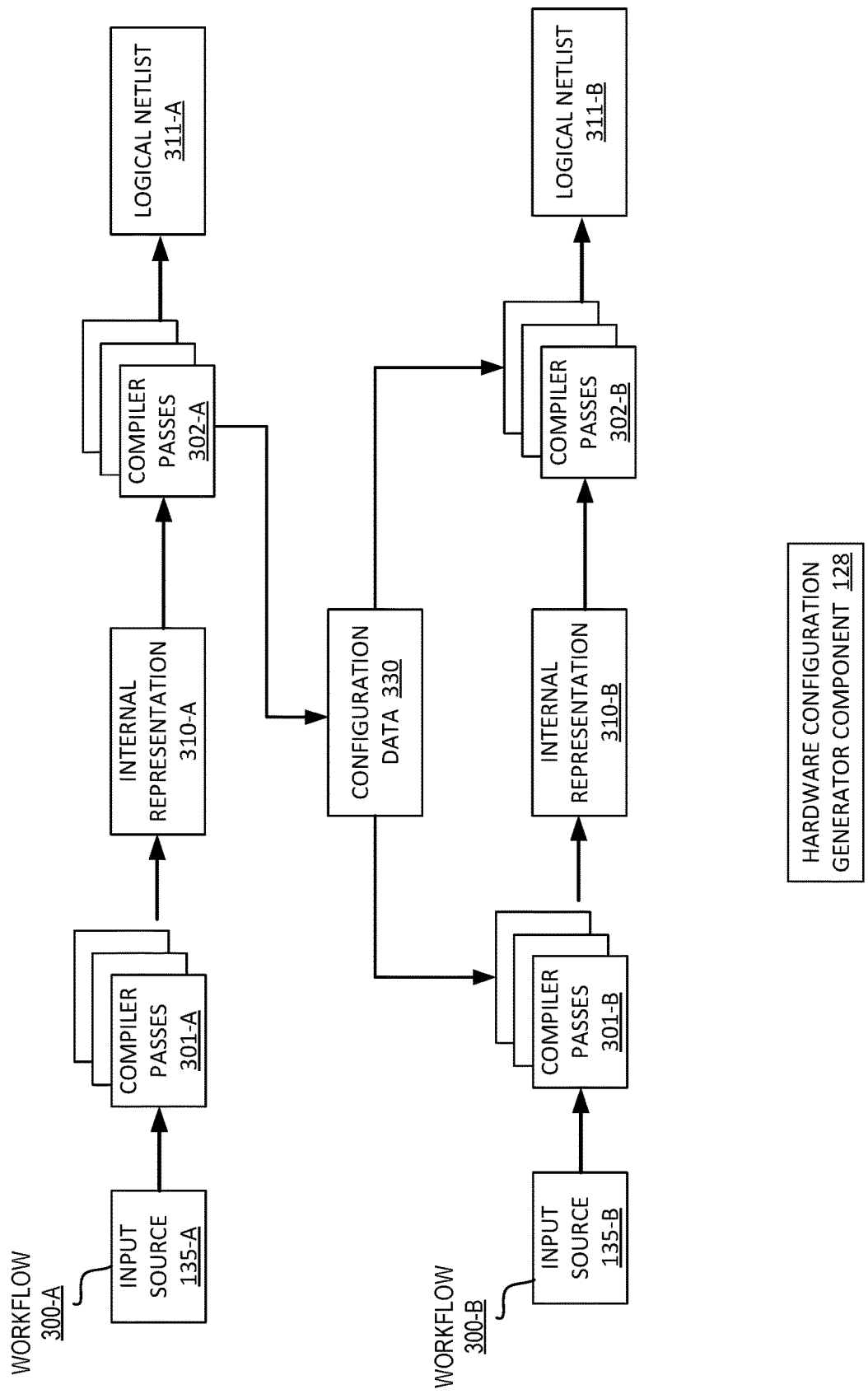
FIG. 3 depicts an illustration of a hardware configuration generation workflow that utilizes configuration data from a different workflow, in accordance with one or more aspects of the present disclosure.

FIG. 3 depicts an illustration of a hardware configuration generation workflow that utilizes configuration data from a different workflow, in accordance with one or more aspects of the present disclosure. As shown in FIG. 3, hardware component generator 128 can execute the various compilation stages of workflows 300-A and 300-B, where configuration data generated by workflow 300-A can direct the subsequent execution of workflow 300-B. As shown in FIG. 3, hardware configuration generator component 128 can be invoked to execute workflows 300-A, 300-B that can each include multiple compilation phases to transform input source into a binary bitstream component. It should be noted that for ease of illustration, workflows 300-A, 300-B each depict two compilation stages (compiler passes 301-A, 302-A, 301-B, 302-B) that generate corresponding internal representation components within the workflows (internal representation 310-A, 310-B, logical netlist 311-A, 311-B), but in other implementations workflows 300-A, 300-B can include more compilation stages that produce additional internal representation components within the workflow to produce a resulting binary bitstream component for a target hardware architecture (e.g., FPGA circuitry).

As shown in FIG. 3, hardware configuration generator component 128 receives input source 135-A and executes the compilation stages of workflow 300-A in a similar manner as that described above with respect to FIG. 2. As shown, compiler passes 302-A can generate configuration data 330 that can be used to direct one or more compilation stages of workflow 330-B. In an illustrative example, configuration data 330 can include information that can be used to determine the differences between input source 135-A and input source 135-B. Additionally or alternatively, configuration data 330 can include information that can be used to determine the differences between the generated internal representation 310-A and internal representation 310-B. In either instance, the configuration data 330 can be used within various stages of workflow 300-B to direct the applicable compilation stage (e.g., compiler passes 301-B, 302-B) to reduce overhead and improve performance.

For example, if the differences between input source 135-A and 135-B are significant, then configuration data 330 can direct hardware component 128 to execute additional compiler passes during compiler passes 301-B. Similarly, if the differences between the generated internal representation 310-A and 310-B are significant, then configuration data 330 can direct hardware component 128 to execute additional compiler passes during compiler passes 302-B. In contrast, if in either case the changes are not significant (e.g., the changes do not cause a difference in the resulting binary bitstream), then the configuration data 300 can direct hardware component 128 to execute fewer compilation passes or bypass a compilation stage entirely. Various examples of this determination are described below with respect to FIG. 5.

Figure 4:
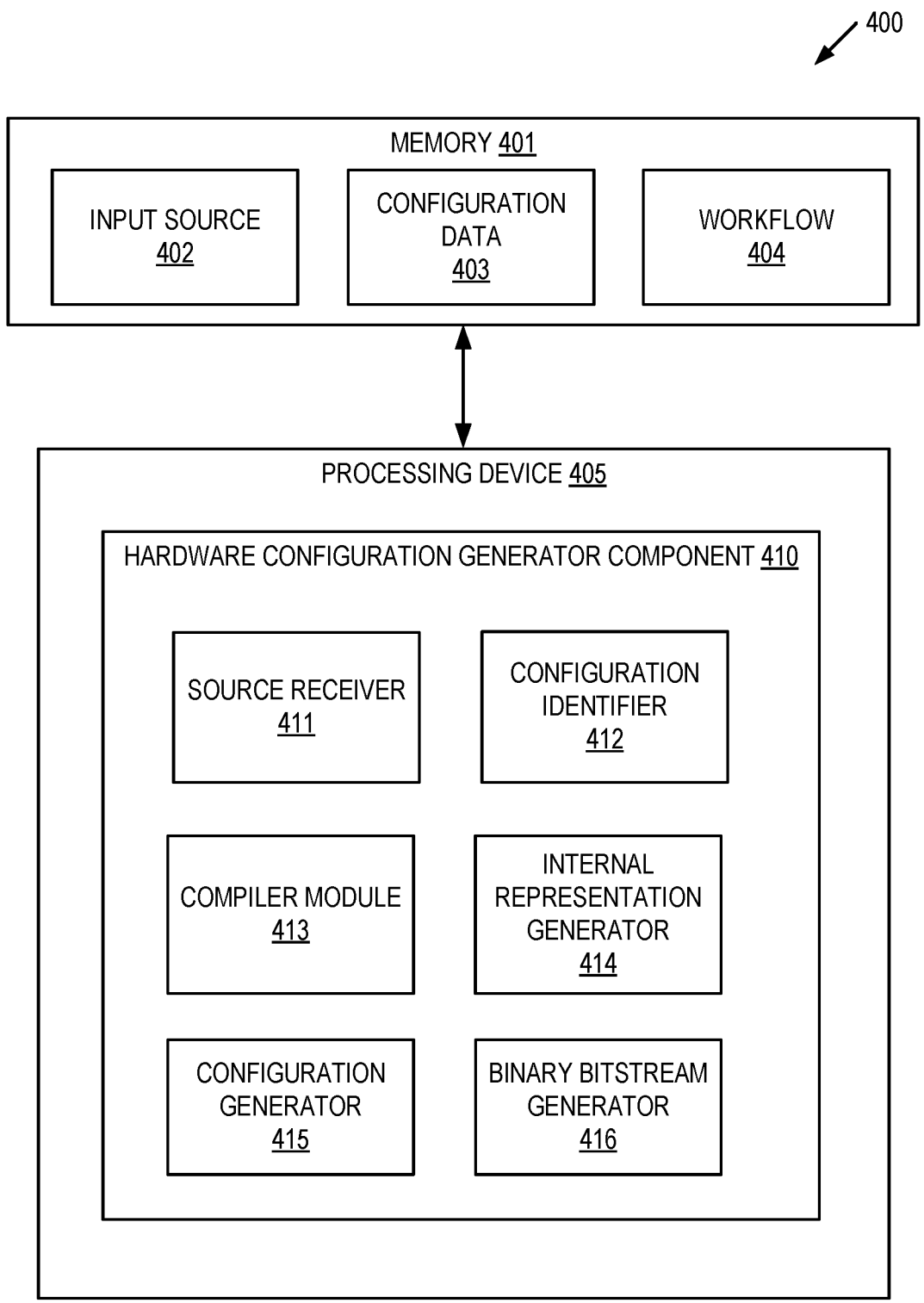
FIG. 4 depicts a block diagram illustrating an example of a hardware configuration generator component for facilitating a compilation framework for hardware configuration generation, in accordance with one or more aspects of the present disclosure.

FIG. 4 depicts a block diagram illustrating an example of a hardware configuration generator component 410 for facilitating a compilation framework for hardware configuration generation. In some implementations, hardware configuration generator component 410 may correspond to hardware configuration generator component 128 of FIG. 1. As shown in FIG. 4, hardware configuration generator component 410 may be a component of a computing apparatus 400 that includes a processing device 405, operatively coupled to a memory 401, to execute consensus component 410. In some implementations, processing device 405 and memory 401 may correspond to processing device 802 and main memory 804 respectively as described below with respect to FIG. 8. In various implementations, computing apparatus 400 can be a standalone host computing device that communicates with various tenant computing devices. Alternatively, computing apparatus 400 can be a component of a cloud computing environment made up of multiple host computing devices, an Internet of Things (IoT) edge device, or the like. In various implementations, the computing apparatus 400 can be a physical device hosted by a computer system. Alternatively, computing apparatus 400 can be a host computing system that hosts a virtual device that includes the hardware configuration generator component 410. As described in further detail below, hardware configuration generator component 410 can be invoked by apparatus 400 to execute a compilation workflow for a target hardware architecture.

Hardware configuration generator component 410 can include source receiver 411, configuration identifier 412, compiler module 413, internal representation generator 414, configuration generator 415, and binary bitstream generator 416. Alternatively, the functionality of one or more of source receiver 411, configuration identifier 412, compiler module 413, internal representation generator 414, configuration generator 415, and binary bitstream generator 416 may be combined into a single module or divided into multiple sub-modules.

Source receiver 411 is responsible for receiving an input source code (e.g., input source 402) associated with a configuration for a target hardware architecture. In various implementations, input source code 402 can include high level language code (e.g., C, C++, Python, etc.) that includes instructions associated with functionalities to be performed by the target hardware architecture. Alternatively, input source code 402 can include target and/or vendor specific Hardware Description Language (HDL) code. As noted above, hardware configuration generator component 410 can be invoked to execute a compilation workflow that includes a series of transformations to convert the received input source code 402 into a binary bitstream representation for the target hardware architecture. In some implementations, the target hardware architecture can include field-programmable gate arrays (FPGA). Alternatively, other target hardware architectures can be used.

In various implementations, source receiver 411 can identify attributes of the source code 402 and determine whether or not to perform transformations of the source code (by invoking compiler module 413) and what transformations should be performed. In some implementations, source receiver 411 can, after receiving the input source 402, access workflow 404 to identify a series of compilation transformations to be performed on the input source 402. For example, if input source 402 includes high level language code, the workflow 404 may specify a series of transformations that convert the source to technology independent internal representations, a technology dependent internal representation, a technology dependent logical netlist, a technology mapped logical netlist, an optimized technology mapped logical netlist, a packed logical netlist, a placed physical netlist, a routed physical netlist, a hardware architecture memory mapping, then a final binary bitstream associated with the hardware architecture. Note that this is only one workflow example. In other implementations, the workflow 404 can include more or fewer transformation phases than those included in this list.

In some implementations, source receiver 411 can determine a starting point in the workflow 404 in view of the received input source 402. For example, if the input source 402 include high level language code, the workflow 404 can be initiated at a particular starting transformation stage that transforms the high level language code into a technology independent internal representation. Alternatively, if input source code 402 includes HDL code, then the workflow 404 can be initiated a later stage, where the first transformation stage generates the technology independent logical netlist. In this instance, the initial transformation stages that operate on high level languages can be bypassed. Notably, in implementations where input source 402 includes high level language code, any transformation stage that converts high level language code into HDL code can also be bypassed to improve efficiency, since the HDL source may not be needed to generate logical netlist internal representations.

Configuration identifier 412 is responsible for identifying configuration information (e.g., configuration data 403) associated with at least a portion of the configuration for the target hardware architecture. In various implementations, configuration data 403 can include information that can be injected at various different transformation stages of the compilation workflow 404 to provide context for those stages. In such instances, the configuration data 403 can be used by a compilation stage of workflow 404 so that the compilation stage should not need to reconstruct information that might have otherwise been obscured by a previous compilation stage. For example, if input source 402 includes HDL code, some information associated with algorithmic functionality that would be properly represented in high level language code might be lost. In such instances, configuration data 403 can include algorithmic representations of functionality associated with the target hardware architecture.

In an illustrative example, the HDL code may have been transformed from high level source code that included a matrix multiplication operation for the target hardware architecture. In transforming the matrix multiplication operation to HDL code, the resulting HDL could represent this operation as a series of lower level multiplication operations and addition operations, thus losing the context of the matrix multiplication operation. Configuration data 403 could include the algorithmic information that describes the matrix multiplication operation so that a subsequent compilation stage would not need to reconstruct the functionality from the HDL code. In other words, a subsequent compilation stage that generates a technology independent logical netlist component (or other internal representation that may follow the HDL code) could refer to the configuration data 403 to use the algorithmic representation of the matrix multiplication functionality to drive the compilation transformation passes most efficiently.

In other implementations, configuration data 403 can include data representing a trained machine learning model to direct the execution of compilation transformation stages within the workflow 404. For example, configuration data 403 can include data representing a machine learning model that determines whether to identify additional configuration data for a particular compilation transformation stage within the workflow. In such instances, the machine learning model, when executed, can analyze the received source code (or an internal representation component generated by a prior compilation stage within the workflow) and determine what type of source code it is and whether algorithmic data is available to direct the compilation process (e.g., a machine learning model can be trained, based on previous workflow executions, implementations of similar source code, attributes associated with the target hardware architecture, or other similar information, to perform one or more determinations described herein). Additionally, the machine learning model can determine, in view of any identified configuration information associated with the source or target hardware, whether or not to apply that configuration data to any particular compilation transformation stage in the workflow.

In other implementations, the machine learning model can determine the compilation passes to be performed at any particular compilation stage in the workflow. In such cases, the machine learning model can utilize attributes of the input source or internal representation produced by a previous stage to determine how many compiler passes to perform in the current stage. Similarly, the machine learning model can examine the results of each compiler pass to determine whether to perform additional passes based on similarly performed passes in other workflows or previous executions of the current workflow. Moreover, since there may be multiple different compiler passes that can be individually executed, the machine learning model can determine which passes to execute and in which order to perform their execution. In various implementations, this can include repetition of individual passes or repetition of all passes selected for execution. As discussed above, the machine learning model can be trained, based on previous workflow executions, implementations of similar source code, attributes associated with the target hardware architecture, or other similar information, to perform one or more determinations described herein.

Compiler module 413 is responsible for performing a set of compilation passes for a particular stage of the compilation workflow 404. In the case of an initial compilation transformation stage, compiler module 413 can perform the set of compilation passes of the input source code (e.g., high level language code, HDL code, etc.). Alternatively, in later stages of the workflow (e.g., stages occurring in the workflow after the first transformation of received source code), compiler module 413 can perform the set of compilation passes to transform one internal representation component into another. For example, in a workflow that includes transforming source into a technology independent internal representation, then into a technology dependent internal representation, compiler module 413 can be invoked to perform the compiler passes to facilitate these transformation. In other words, compiler module 413 can be invoked to transform a high level source into the technology independent internal representation. Subsequently, compiler module 413 can be invoked again to transform the technology independent internal representation into a technology dependent internal representation.

In various implementations, compiler module 413 can perform each set of compilation passes in view of the configuration information identified by configuration identifier 412 (e.g., configuration data 403). As noted above, compiler module 413 can incorporate the configuration information to direct the compilation passes for each stage of the workflow to provide addition context for that stage. Thus, the compilation transformation process can execute more efficiently by avoiding any overhead involved in rediscovering algorithmic representations of functionality that may have otherwise been lost (or abstracted out) in the performance of compilation passes for a previous stage in the workflow. In instances where the configuration data includes algorithmic representations of functionalities, compiler module 413 can input that data to better direct the compilation passes for a particular stage. Additionally, this type of configuration data can be used to reduce the number of passes since the compiler would not need to rediscover/reconstruct the instructions necessary to perform the associated functionality. In such instances, by receiving the configuration data separately, compiler module 413 can be extended for various different workflows and target hardware architectures without needing to rewrite and/or reconfigure the compiler module 413 for each different implementation.

Similarly, in implementations where the configuration information includes machine learning models, compiler module 413 can invoke the model(s) or receive information produced by the models to direct the execution of the compiler passes. As noted above, compiler module 413 can determine the compiler passes for each stage of the workflow using information produced by the machine learning models. In such instances, the machine learning models can analyze previous executions of the current workflow, previous executions of similar stages in other workflows, or other similar information to direct the current compilation transformation stage. In some instances, this information can be used to determine the passes to be executed. Additionally, or alternatively, this information can be used to direct the compiler to retrieve additional algorithmic functionality configuration data that should be incorporated into the currently executing compilation transformation stage.

Internal representation generator 414 is responsible for generating an internal representation component for the target hardware in view of the compilation passes performed by compiler 413 in a particular stage of the workflow. In various implementations, compiler 413 can invoke internal representation generator 414 once a determination has been made that the compiler 413 has completed enough passes to produce the internal representation component for the executing workflow stage. For example, in a workflow with a stage that transforms high level source into a technology independent internal representation, internal representation generator 414 can generate the resulting technology independent internal representation component based on the output of the compiler 413. The resulting internal representation component can be subsequently passed to additional stages of the workflow.

Configuration generator 415 is responsible for generating additional configuration information in view of the compilation passes of a stage in the workflow. In other words, at any stage in a workflow, the compiler 413 can not only receive configuration information that can be used to direct that set of compiler passes, but it can also generate additional configuration information that can be used by later stages of the same workflow. In such instances, the configuration generator 415 can be invoked by compiler 413 to generate additional configuration data that may be produced by that set of compiler passes. For example, during a compilation stage that transforms source code into an internal representation component, the configuration generator 415 could store portions of the source code that are directed to particular algorithmic functionality that could be used by later stages of the workflow. Similarly, configuration generator 415 can either generate or update a machine learning model with information generated by one workflow stage to further inform a later workflow stage.

In some implementations, configuration generator 415 can use configuration information received from a previous workflow stage to generate new configuration information to use in the current stage. For example, compiler 413 can receive configuration information that includes algorithmic representation of functionality provided by received source code or internal representation component. The configuration generator 415 can determine performance metrics associated with the algorithmic representation in view of the target hardware architecture. In other words, given knowledge about the intended target hardware, configuration generator 415 can analyze a transformed internal representation generated by the current stage of the workflow and determine whether or not the resulting hardware structure achieves a particular level of performance. Configuration generator 415 can subsequently generate information that can be used to direct performance of additional compilation passes in the current stage of the workflow, perform one or more other stages of the workflow, or bypass one or more stages of the workflow.

For example, configuration generator 415 can determine whether a resulting circuit connection transfers data within a particular time or energy threshold. Similarly, configuration generator 415 can determine whether a the internal representation component associated with a algorithmic functionality (e.g., a matrix multiplication functionality) performs its operation within a particular processing and/or energy threshold. If the threshold(s) are satisfied, additional stages in the workflow can be performed in accordance with the workflow path. In other words, the above process can be repeated for subsequent compilation stages of the workflow. If, however, the performance threshold is not satisfied for a particular stage, configuration generator 415 can generate information that can be used to repeat a previous stage and/or bypass one or more subsequent stages of the workflow. For example, if a workflow stage results in an internal representation component with poor performance, configuration generator 415 can terminate the current stage of the workflow without performing any subsequent stages. Alternatively, configuration generator 415 can terminate the current stage and fall back to a previous state to repeat a previous compilation stage to regenerate the internal representation component. In addition to falling back or terminating, the configuration generator 415 can also generate configuration data that can be input to previous stages in the workflow in order to meet constraints.

Binary bitstream generator 416 is responsible for generating the binary bitstream component for the target hardware architecture. In various implementations, binary bitstream generator 416 can be invoked as the final stage of a workflow to generate the representation of the target hardware architecture circuitry to be used to implement the logic received in the first stage of the workflow. As noted above, the above processing may be repeated for each stage of a workflow until binary bitstream generator 416 is invoked to generate the final bitstream component for the target hardware. It should be noted that while for simplicity of illustration, particular workflow stages have been described above, in various implementations, aspects of the present disclosure can be applied to workflows with more or fewer stages that perform similar or differing compilation transformations for internal representations for a target hardware architecture.

Figure 5:
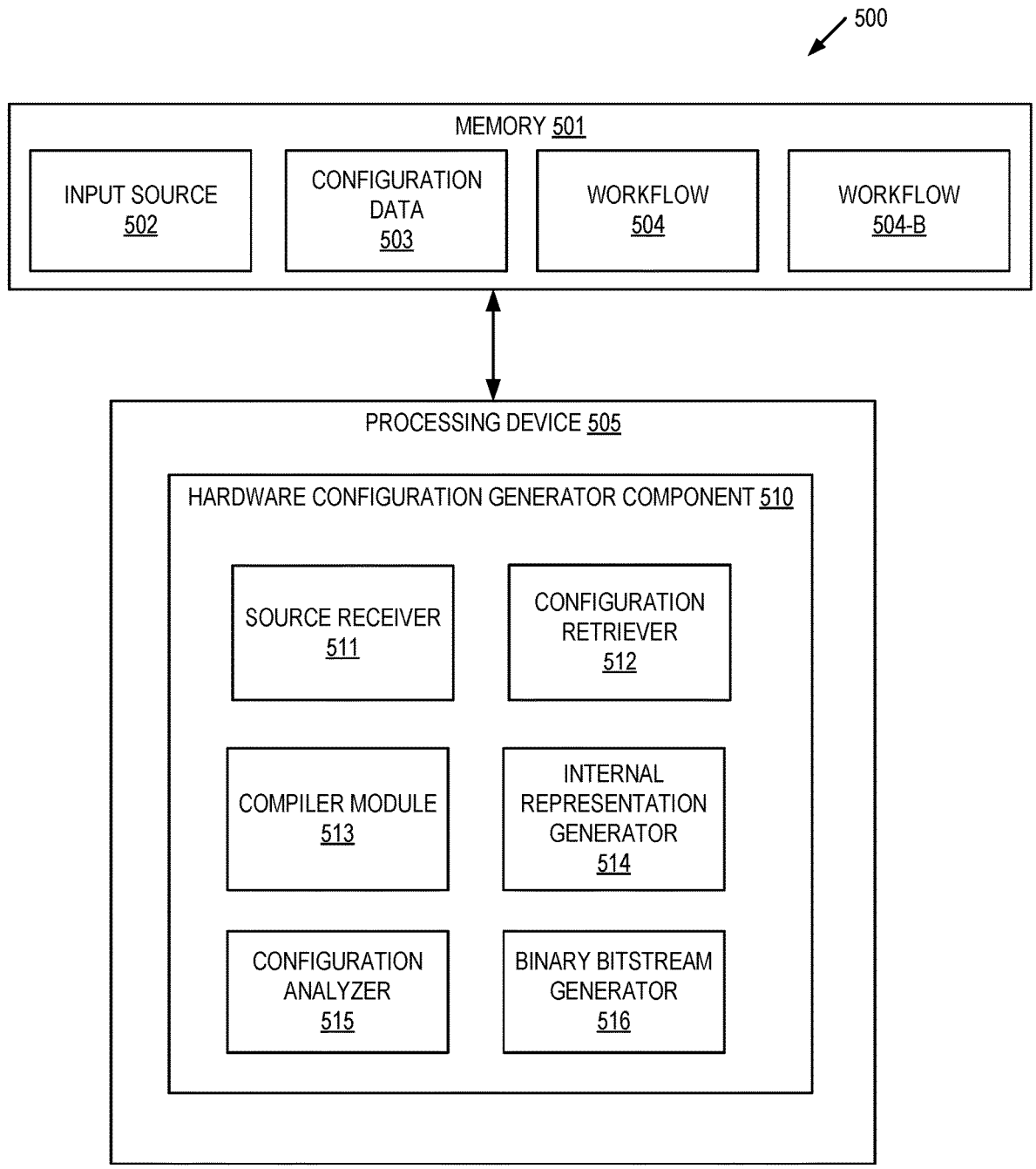
FIG. 5 depicts a block diagram illustrating an example of a hardware configuration generator component for facilitating a compilation framework for hardware configuration generation using information generated by previously executed compilation workflows, in accordance with one or more aspects of the present disclosure.

FIG. 5 depicts a block diagram illustrating an example of a hardware configuration generator component 510 for facilitating a compilation framework for hardware configuration generation using information generated by previously executed compilation workflows. In some implementations, hardware configuration generator component 510 may correspond to hardware configuration generator component 128 of FIG. 1. As shown in FIG. 5, hardware configuration generator component 510 may be a component of a computing apparatus 500 that includes a processing device 505, operatively coupled to a memory 501, to execute consensus component 510. In some implementations, processing device 505 and memory 501 may correspond to processing device 802 and main memory 804 respectively as described below with respect to FIG. 8. In various implementations, computing apparatus 500 can be a standalone host computing device that communicates with various tenant computing devices. Alternatively, computing apparatus 500 can be a component of a cloud computing environment made up of multiple host computing devices, an Internet of Things (IoT) edge device, or the like. In various implementations, the computing apparatus 500 can be a physical device hosted by a computer system. Alternatively, computing apparatus 500 can be a host computing system that hosts a virtual device that includes the hardware configuration generator component 510. As described in further detail below, hardware configuration generator component 510 can be invoked by apparatus 500 to execute a compilation workflow (e.g., workflow 504) for a target hardware architecture.

Hardware configuration generator component 510 can include source receiver 511, configuration retriever 512, compiler module 513, internal representation generator 514, configuration analyzer 515, and binary bitstream generator 516. Alternatively, the functionality of one or more of include source receiver 511, configuration retriever 512, compiler module 513, internal representation generator 514, configuration analyzer 515, and binary bitstream generator 516 may be combined into a single module or divided into multiple sub-modules.

Source receiver 511 is responsible for receiving an input source code (e.g., input source 502) associated with a configuration for a target hardware architecture. In various implementations, input source code 502 can include high level language code (e.g., C, C++, Python, etc.) that includes instructions associated with functionalities to be performed by the target hardware architecture. Alternatively, input source code 502 can include target and/or vendor specific Hardware Description Language (HDL) code. As noted above, hardware configuration generator component 510 can be invoked to execute a compilation workflow (e.g., workflow 504) that includes a series of transformations to convert the received input source code 502 into a binary bitstream representation for the target hardware architecture. In some implementations, the target hardware architecture can include field-programmable gate arrays (FPGA). Alternatively, other target hardware architectures can be used. Source receiver 511 can perform operations as described above with respect to source receiver 411 of FIG. 4.

Configuration retriever 512 is responsible for retrieving configuration information associated with at least a portion of the configuration for the target hardware architecture (e.g., configuration data 503). In various implementations, the retrieved configuration information is generated by a previous execution of the compilation workflow. In other words, the configuration information retrieved by configuration retriever 512 can be generated by a compilation stage in a different workflow (e.g., workflow 504-B) or the same workflow that was executed at a previous time. In contrast to the process described in FIG. 4 which describes utilizing configuration data generated by previous stages of the same workflow, configuration retriever 512 can additionally retrieve configuration information for the workflow stage that was generated during a previous execution of the workflow, as well as configuration information generated during the execution of a different workflow (e.g., workflow 504-B).

As described above with respect to FIG. 4, configuration data 503 can include information that can be injected at various different transformation stages of the compilation workflow 504 to provide context for those stages. In some implementations, as described above, configuration data 503 can include algorithmic representations of functionality associated with the target hardware architecture. In some implementations, as described above, configuration data 503 can include data representing one or more machine learning models trained to direct the execution of compilation transformation stages within the workflow 504.

In some implementations, configuration data 503 can include information associated with a previous version of the input source code or internal representation component being generated by an executing compilation stage of the workflow 504. In such instances, the configuration data 503 can direct the performance of compilation passes for a particular stage of the compilation workflow 504 in view of any detected changes. For example, if changes made to the source or internal representation component for a particular workflow stage indicate that the changes should not affect the resulting binary bitstream component, subsequent compilation passes or workflow stages can be bypassed or modified accordingly. In contrast, if the detected changes result in a global change in the resulting bitstream, then additional passes or stages can be included to the workflow dynamically.

In such instances, the configuration data 503 can include a complete listing of a previous version of the input source code, HDL, or internal representation. In such instances, the workflow stage can retrieve this information and execute a comparison between the current version and the previous version to determine the differences. Alternatively, the retrieved configuration data 503 can include the changes which can be analyzed directly by the workflow stage. In these instances, the workflow can execute a pre-processing stage (not pictured) that analyzes the differences between the product(s) of the previous version of the workflow with respect to the current workflow to determine the differences prior to executing a particular compilation stage. The use of the information is described in further detail below with respect to configuration analyzer 515.

Compiler module 513 is responsible for performing a set of compilation passes for a particular stage of the compilation workflow 504. As described above, in the case of an initial compilation transformation stage, compiler module 513 can perform the set of compilation passes of the input source code (e.g., high level language code, HDL code, etc.). Alternatively, in later stages of the workflow (e.g., stages occurring in the workflow after the first transformation of received source code), compiler module 513 can perform the set of compilation passes to transform one internal representation component into another. For example, in a workflow that includes transforming source into a technology independent internal representation, then into a technology dependent internal representation, compiler module 513 can be invoked to perform the compiler passes to facilitate these transformation. In other words, compiler module 513 can be invoked to transform a high level source into the technology independent internal representation. Subsequently, compiler module 513 can be invoked again to transform the technology independent internal representation into a technology dependent internal representation.

Also as described above, compiler module 513 can perform each set of compilation passes in view of the configuration information identified by configuration retriever 512 (e.g., configuration data 503). As noted above, compiler module 513 can incorporate the configuration information to direct the compilation passes for each stage of the workflow to provide addition context for that stage. In instances where the configuration data includes algorithmic representations of functionalities, compiler module 513 can input that data to better direct the compilation passes for a particular stage. Similarly, in implementations where the configuration information includes data representing machine learning models, compiler module 513 can invoke the model(s) or receive information produced by the models to direct the execution of the compiler passes.

Internal representation generator 514 is responsible for generating an internal representation component for the target hardware in view of the compilation passes performed by compiler 513 in a particular stage of the workflow. In various implementations, compiler 513 can invoke internal representation generator 514 once a determination has been made that the compiler 513 has completed enough passes to produce the internal representation component for the executing workflow stage. For example, in a workflow with a stage that transforms high level source into a technology independent internal representation, internal representation generator 514 can generate the resulting technology independent internal representation component based on the output of the compiler 513. The resulting internal representation component can be subsequently passed to additional stages of the workflow.

Configuration analyzer 515 is responsible for analyzing configuration information that includes information associated with a previous version of input source code, HDL, or other internal representation to direct execution of compilation stages of the workflow 504. As noted above, the configuration information can include the previous version of the source/internal representation. In such instances, configuration analyzer 515 can compare the previous version to the current version to identify changes between the two. In some implementations, configuration analyzer 515 can be invoked as a pre-processor for the workflow so that the comparison can be conducted before the compilation stages of the workflow are invoked. Alternatively, configuration analyzer 515 can receive configuration information that is stored as a list of the changes between the versions (e.g., generated by a source code change management system or other similar system or component). In such instances, configuration analyzer 515 can analyze the changes directly to determine whether or not the identified changes indicate an impact to the resulting binary bitstream component for the target architecture.

In various implementations, configuration analyzer 515 can analyze the set of differences and determine whether the differences satisfies a threshold. In such instances, configuration analyzer 515 can determine whether the differences between the versions involve a portion of the source or internal representation that affect performance of the resulting hardware component. For example, configuration analyzer 515 can determine if the changes involve the addition of a new algorithmic functionality that may cause an increase in data transfer or processor resources. Similarly, configuration analyzer 515 can determine if the changes increase the complexity of existing functionality (e.g., by changing a simple mathematical operation to a matrix multiplication operation). Configuration analyzer 515 can determine whether the changes meet or exceed a threshold in terms of lines of code changed, complexity of operation changed, amount of resources required changed, amount of target hardware circuitry changed, or any other similar metric.

If the threshold is satisfied (e.g., the detected changes impact the resulting bitstream component), additional compilation passes for the compilation stage (or additional stages in the workflow) can be performed in accordance with the workflow path. In other words, the subsequent compilation stages of the workflow can be executed in full to regenerate the subsequent components in the workflow. If, however, the threshold is not satisfied for a particular stage with respect to the amount changes (e.g., the changes are minimal or do not affect the resulting bitstream component), configuration analyzer 515 can generate information that can be used to bypass one or more compilation passes of the current stage of the workflow or modify the portion of the internal representation that is regenerated for the current stage of the workflow. In such instances, the compiler 513 can be directed to regenerate only a portion of the internal representation rather than execute a complete transformation cycle from scratch. In other instances, configuration analyzer 515 can generate information that can be used to bypass subsequent stages of the workflow. For example, if a workflow stage results in an internal representation component with minimal changes, configuration analyzer 515 can determine that one or more subsequent stages do not need to be executed, and proceed to a later stage in the workflow.

As noted above, binary bitstream generator 516 is responsible for generating the binary bitstream component for the target hardware architecture. In various implementations, binary bitstream generator 516 can be invoked as the final stage of a workflow to generate the representation of the target hardware architecture circuitry to be used to implement the logic received in the first stage of the workflow. As noted above, the above processing may be repeated for each stage of a workflow until binary bitstream generator 516 is invoked to generate the final bitstream component for the target hardware. It should be noted that while for simplicity of illustration, particular workflow stages have been described above, in various implementations, aspects of the present disclosure can be applied to workflows with more or fewer stages that perform similar or differing compilation transformations for internal representations for a target hardware architecture.

Figure 6:
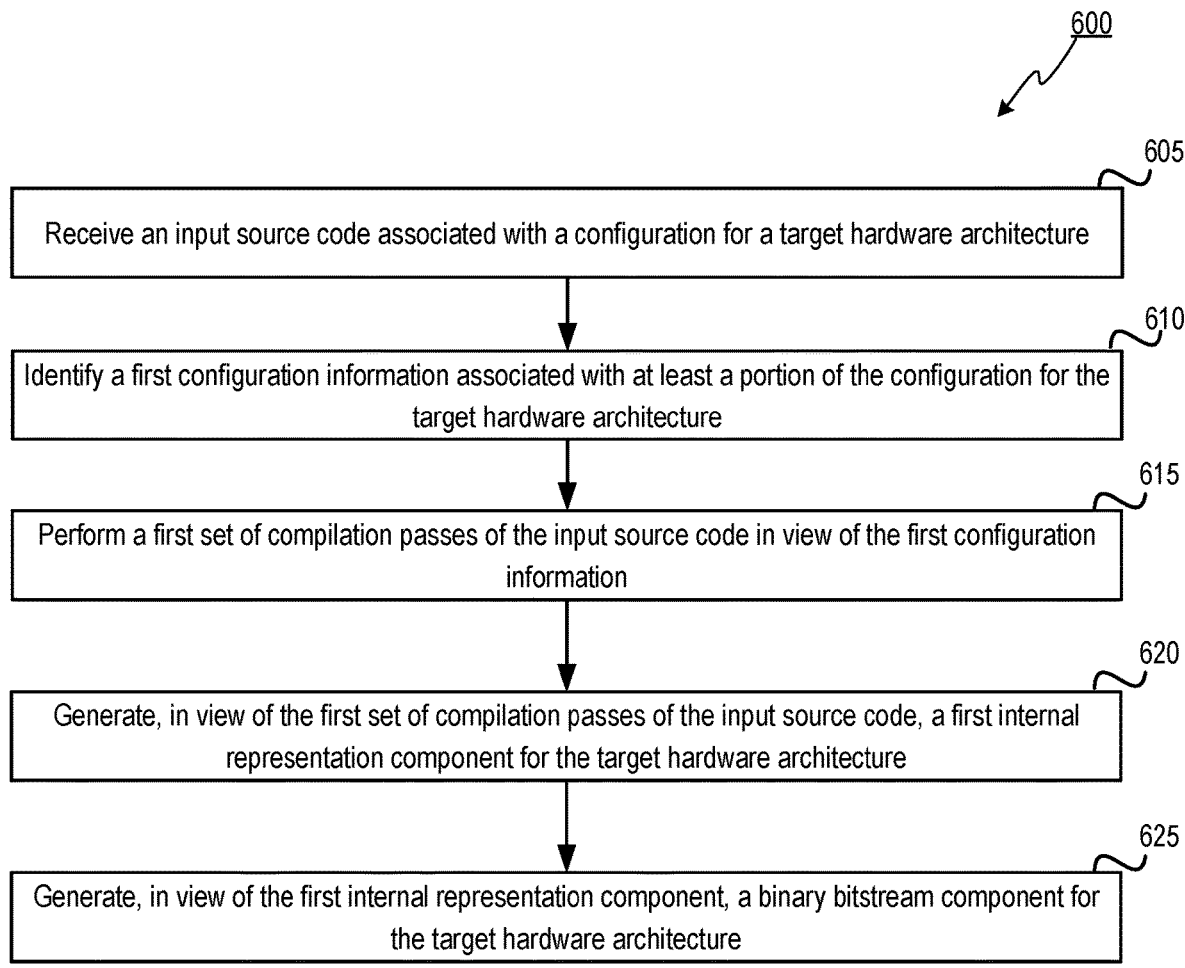
FIG. 6 is a flow diagram of an example method of facilitating a compilation framework for hardware configuration generation, in accordance with one or more aspects of the present disclosure.

FIG. 6 depicts a flow diagram of an example method 600 for facilitating a compilation framework for hardware configuration generation, in accordance with one or more aspects of the present disclosure. Method 600 may be performed by processing logic that includes hardware (e.g., circuitry, dedicated logic, programmable logic, microcode, etc.), software (e.g., instructions run on a processor to perform hardware simulation), or a combination thereof. Method 600 or each of its individual functions, routines, subroutines, or operations may be performed by one or more processors of a computer system (e.g., the host computer system 110 of FIG. 1) implementing the method. In an illustrative example, method 600 may be performed by hardware configuration generator component 128 in FIG. 1 or hardware configuration generator component 410 in FIG. 4. Alternatively, some or all of method 600 might be performed by another module or machine. Method 600 may be performed by a single processing thread. Alternatively, method 600 may be performed by two or more processing threads, each thread implementing one or more individual functions, routines, subroutines, or operations of the method. In an illustrative example, the processing threads implementing method 600 may be synchronized (e.g., using semaphores, critical sections, or other thread synchronization mechanisms). Alternatively, the processing threads implementing method 600 may be executed asynchronously with respect to each other. Therefore, while FIG. 6 and the associated description lists the operations of method 600 in certain order, various implementations of the method may perform at least some of the described operations in parallel or in arbitrary selected orders.

At block 605, processing logic receives an input source code associated with a configuration for a target hardware architecture. At block 610, processing logic identifies a first configuration information associated with at least a portion of the configuration for the target hardware architecture. At block 615, processing logic performs a first set of compilation passes of the input source code in view of the first configuration information. At block 620, processing logic generates, in view of the first set of compilation passes of the input source code, a first internal representation component for the target hardware architecture. At block 625, processing logic generates, in view of the first internal representation component, a binary bitstream component for the target hardware architecture.

Figure 7:
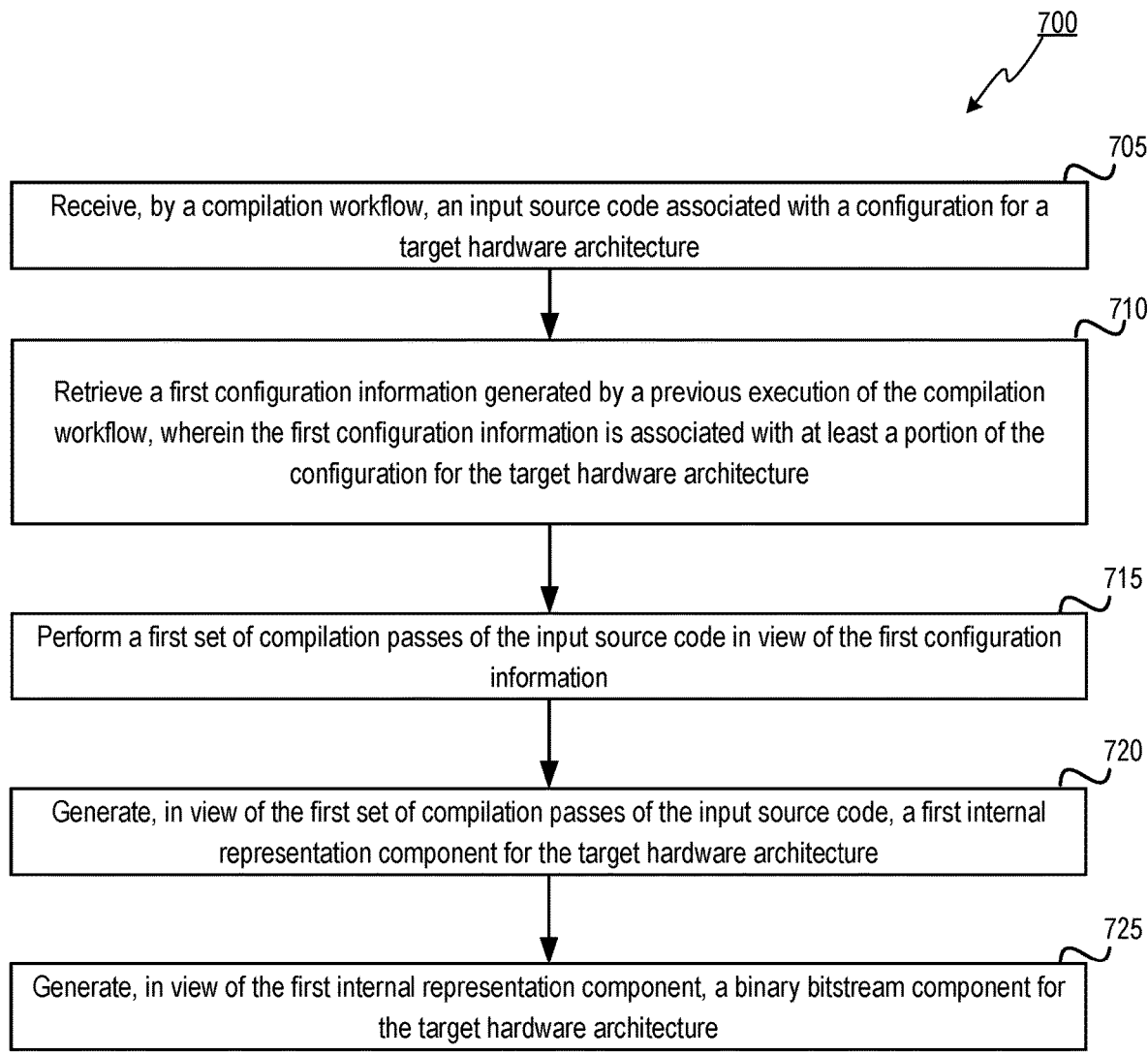
FIG. 7 is a flow diagram of an example method of facilitating a compilation framework for hardware configuration generation using information generated by previously executed compilation workflows, in accordance with one or more aspects of the present disclosure.

FIG. 7 depicts a flow diagram of an example method 700 for facilitating a compilation framework for hardware configuration generation using information generated by previously executed compilation workflows, in accordance with one or more aspects of the present disclosure. Method 700 may be performed by processing logic that includes hardware (e.g., circuitry, dedicated logic, programmable logic, microcode, etc.), software (e.g., instructions run on a processor to perform hardware simulation), or a combination thereof. Method 700 or each of its individual functions, routines, subroutines, or operations may be performed by one or more processors of a computer system (e.g., the host computer system 110 of FIG. 1) implementing the method. In an illustrative example, method 700 may be performed by hardware configuration generator component 128 in FIG. 1 or hardware configuration generator component 510 in FIG. 5. Alternatively, some or all of method 700 might be performed by another module or machine. Method 700 may be performed by a single processing thread. Alternatively, method 700 may be performed by two or more processing threads, each thread implementing one or more individual functions, routines, subroutines, or operations of the method. In an illustrative example, the processing threads implementing method 700 may be synchronized (e.g., using semaphores, critical sections, or other thread synchronization mechanisms). Alternatively, the processing threads implementing method 700 may be executed asynchronously with respect to each other. Therefore, while FIG. 7 and the associated description lists the operations of method 700 in certain order, various implementations of the method may perform at least some of the described operations in parallel or in arbitrary selected orders.

Figure 8:
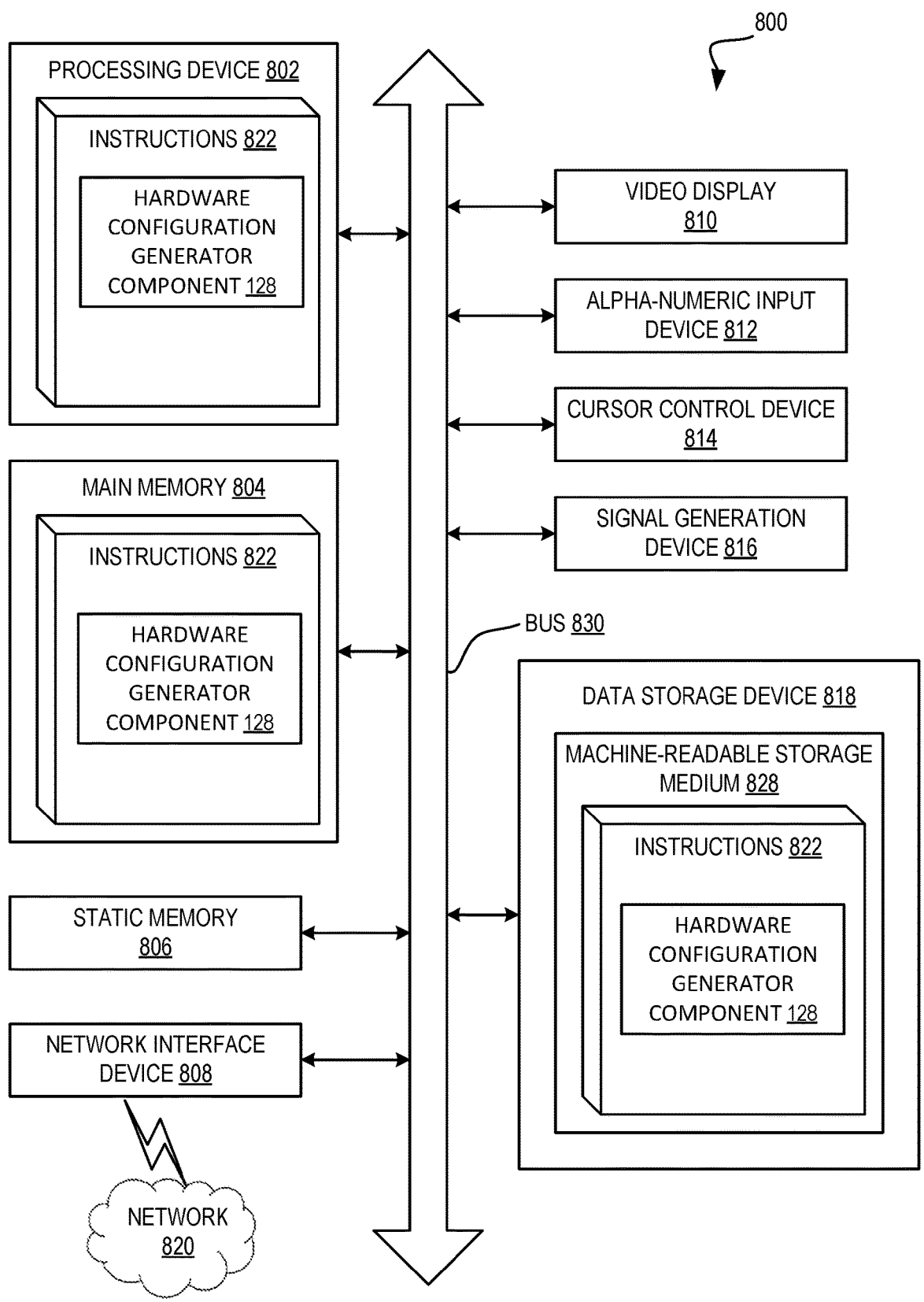
FIG. 8 depicts a block diagram of an illustrative computer system operating in accordance with one or more aspects of the present disclosure.

At block 705, processing logic receives an input source code associated with a configuration for a target hardware architecture. At block 710, processing logic retrieves a first configuration information generated by a previous execution of the compilation workflow, wherein the first configuration information is associated with at least a portion of the configuration for the target hardware architecture. At block 715, processing logic performs a first set of compilation passes of the input source code in view of the first configuration information. At block 720, processing logic generates, in view of the first set of compilation passes of the input source code, a first internal representation component for the target hardware architecture. At block 725, processing logic generates, in view of the first internal representation component, a binary bitstream component for the target hardware architecture FIG. 8 depicts a block diagram of a computer system operating in accordance with one or more aspects of the disclosure. In various illustrative examples, computer system 800 may correspond to a computing device within system architecture 100 of FIG. 1, apparatus 400 of FIG. 4, and/or apparatus 500 of FIG. 5. The computer system 800 may be included within a data center that supports virtualization. Virtualization within a data center results in a physical system being virtualized using VMs to consolidate the data center infrastructure and increase operational efficiencies. A VM may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host system to translate these requests to the underlying physical computing hardware resources. This type of virtualization results in multiple VMs sharing physical resources.

In certain implementations, computer system 800 may be connected (e.g., via a network, such as a Local Area Network (LAN), an intranet, an extranet, or the Internet) to other computer systems. Computer system 800 may operate in the capacity of a server or a client computer in a client-server environment, or as a peer computer in a peer-to-peer or distributed network environment. Computer system 800 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 800 may include a processing device 802, a volatile memory 804 (e.g., random access memory (RAM)), a non-volatile memory 806 (e.g., read-only memory (ROM) or electrically-erasable programmable ROM (EEPROM)), and a data storage device 818, which may communicate with each other, as well as with other components of the system via a bus 830.

Processing device 802 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), a graphics processing unit (GPU), a network processor, or the like).

Computer system 800 may further include a network interface device 808. Computer system 800 also may include a video display unit 810 (e.g., an LCD), an alphanumeric input device 812 (e.g., a keyboard), a cursor control device 814 (e.g., a mouse), and a signal generation device 816.

Data storage device 818 may include a non-transitory computer-readable storage medium 828 on which may store instructions 822 embodying any one or more of the methodologies or functions described herein (e.g., hardware configuration generator component 128). Instructions 822 may also reside, completely or partially, within volatile memory 804 and/or within processing device 802 during execution thereof by computer system 800, hence, volatile memory 804 and processing device 802 may also constitute machine-readable storage media.

While computer-readable storage medium 828 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "identifying," "determining," "generating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300, and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

Other computer system designs and configurations may also be suitable to implement the systems and methods described herein. The following examples illustrate various implementations in accordance with one or more aspects of the present disclosure.

Example 1 is a method comprising: receiving, by a processing device executing a compilation workflow for a target hardware architecture, an input source code associated with a configuration for the target hardware architecture; identifying a first configuration information associated with at least a portion of the configuration for the target hardware architecture; performing a first set of compilation passes of the input source code in view of the first configuration information; generating, in view of the first set of compilation passes of the input source code, a first internal representation component for the target hardware architecture; and generating, in view of the first internal representation component, a binary bitstream component for the target hardware architecture.

Example 2 is the method of Example 1, further comprising: generating, in view of the first set of compilation passes, a second configuration information associated with at least an additional portion of the configuration for the target hardware architecture.

Example 3 is the method of Example 2, further comprising: performing a second set of compilation passes of the first internal representation component in view of at least one of the first configuration information or the second configuration information; and generating, in view of the second set of compilation passes of the first internal representation component, a second internal representation component for the target hardware architecture.

Example 4 is the method of Example 2, wherein the second configuration information comprises an algorithmic representation of a functionality provided by the first internal representation component, the method further comprising: determining a performance metric associated with the algorithmic representation of the functionality in the second configuration information in view of the target hardware architecture; and responsive to determining that the performance metric satisfies a threshold, performing a second set of compilation passes of the first internal representation component in view of at least one of the first configuration information or the second configuration information.

Example 5 is the method of Example 2, wherein the second configuration information comprises an algorithmic representation of a functionality provided by the first internal representation component, the method further comprising: determining a performance metric associated with the algorithmic representation of the functionality in the second configuration information in view of the target hardware architecture; and responsive to determining that the performance metric does not satisfy a threshold, bypassing performing an additional set of compilation passes of the first internal representation component.

Example 6 is the method of Example 1, wherein the first configuration information comprises an algorithmic representation of a functionality associated with the target hardware configuration.

Example 7 is the method of Example 1, wherein the first configuration information comprises data representing a machine learning model trained to perform at least one of determining whether to identify an additional configuration information, or determining a number of compilation passes in the set of compilation passes.

Example 8 is a system comprising: a memory; and a processing device operatively coupled to the memory, the processing device to: receive an input source code associated with a configuration for a target hardware architecture; identify a first configuration information associated with at least a portion of the configuration for the target hardware architecture; perform a first set of compilation passes of the input source code in view of the first configuration information; generate, in view of the first set of compilation passes of the input source code, a first internal representation component for the target hardware architecture; and generate, in view of the first internal representation component, a binary bitstream component for the target hardware architecture.

Example 9 is the system of Example 8, wherein the processing device is further to: generate, in view of the first set of compilation passes, a second configuration information associated with at least an additional portion of the configuration for the target hardware architecture.

Example 10 is the system of Example 9, wherein the processing device is further to: perform a second set of compilation passes of the first internal representation component in view of at least one of the first configuration information or the second configuration information; and generate, in view of the second set of compilation passes of the first internal representation component, a second internal representation component for the target hardware architecture.

Example 11 is the system of Example 9, wherein the second configuration information comprises an algorithmic representation of a functionality provided by the first internal representation component, and wherein the processing device is further to: determine a performance metric associated with the algorithmic representation of the functionality in the second configuration information in view of the target hardware architecture; and responsive to determining that the performance metric satisfies a threshold, perform a second set of compilation passes of the first internal representation component in view of at least one of the first configuration information or the second configuration information.

Example 12 is the system of Example 9, wherein the second configuration information comprises an algorithmic representation of a functionality provided by the first internal representation component, and wherein the processing device is further to: determine a performance metric associated with the algorithmic representation of the functionality in the second configuration information in view of the target hardware architecture; and responsive to determining that the performance metric does not satisfy a threshold, bypass performing an additional set of compilation passes of the first internal representation component.

Example 13 is the system of Example 8, wherein the first configuration information comprises data representing a machine learning model trained to perform at least one of determining whether to identify an additional configuration information, or determining a number of compilation passes in the set of compilation passes.

Example 14 is a non-transitory computer-readable media storing instructions that, when executed, cause a processing device to: receive an input source code associated with a configuration for a target hardware architecture; identify a first configuration information associated with at least a portion of the configuration for the target hardware architecture; perform a first set of compilation passes of the input source code in view of the first configuration information; generate, in view of the first set of compilation passes of the input source code, a first internal representation component for the target hardware architecture; and generate, in view of the first internal representation component, a binary bitstream component for the target hardware architecture.

Example 15 is the non-transitory computer-readable media of Example 14, wherein the processing device is further to: generate, in view of the first set of compilation passes, a second configuration information associated with at least an additional portion of the configuration for the target hardware architecture.

Example 16 is the non-transitory computer-readable media of Example 15, wherein the processing device is further to: perform a second set of compilation passes of the first internal representation component in view of at least one of the first configuration information or the second configuration information; and generate, in view of the second set of compilation passes of the first internal representation component, a second internal representation component for the target hardware architecture.

Example 17 is the non-transitory computer-readable media of Example 15, wherein the second configuration information comprises an algorithmic representation of a functionality provided by the first internal representation component, and wherein the processing device is further to: determine a performance metric associated with the algorithmic representation of the functionality in the second configuration information in view of the target hardware architecture; and responsive to determining that the performance metric satisfies a threshold, perform a second set of compilation passes of the first internal representation component in view of at least one of the first configuration information or the second configuration information.

Example 18 is the non-transitory computer-readable media of Example 15, wherein the second configuration information comprises an algorithmic representation of a functionality provided by the first internal representation component, and wherein the processing device is further to: determine a performance metric associated with the algorithmic representation of the functionality in the second configuration information in view of the target hardware architecture; and responsive to determining that the performance metric does not satisfy a threshold, bypass performing an additional set of compilation passes of the first internal representation component.

Example 19 is the non-transitory computer-readable media of Example 14, wherein the first configuration information comprises an algorithmic representation of a functionality associated with the target hardware configuration.

Example 20 is the non-transitory computer-readable media of Example 14, wherein the first configuration information comprises data representing a machine learning model trained to perform at least one of determining whether to identify an additional configuration information, or determining a number of compilation passes in the set of compilation passes.

Example 21 is a method comprising: receiving, by a processing device executing a compilation workflow for a target hardware architecture, an input source code associated with a configuration for the target hardware architecture; retrieving a first configuration information generated by a previous execution of the compilation workflow, wherein the first configuration information is associated with at least a portion of the configuration for the target hardware architecture; performing a first set of compilation passes of the input source code in view of the first configuration information from the previous execution of the compilation workflow; generating, in view of the first set of compilation passes of the input source code, a first internal representation component for the target hardware architecture; and generating, in view of the first internal representation component, a binary bitstream component for the target hardware architecture.

Example 22 is the method of Example 21, wherein the configuration information comprises an algorithmic representation of a functionality provided by the first internal representation component, the method further comprising: determining a performance metric associated with the algorithmic representation of the functionality in the configuration information in view of the target hardware architecture; and responsive to determining that the performance metric satisfies a threshold, performing a second set of compilation passes of the first internal representation component in view of at least one of the first configuration information or the second configuration information.

Example 23 is the method of Example 21, wherein the configuration information comprises an algorithmic representation of a functionality provided by the first internal representation component, the method further comprising: determining a performance metric associated with the algorithmic representation of the functionality in the configuration information in view of the target hardware architecture; and responsive to determining that the performance metric does not satisfy a threshold, bypassing performing an additional set of compilation passes of the first internal representation component.

Example 24 is the method of Example 21, wherein the configuration information comprises information associated with a previous version of the input source code.

Example 25 is the method of Example 24, further comprising: determining a set of differences between the input source code and the previous version of the input source code; determining whether the set of differences between the input source code and the previous version of the input source code satisfies a threshold; and responsive to determining that the set of differences satisfies the threshold, performing an additional set of compilation passes of the input source code.

Example 26 is the method of Example 24, further comprising: determining a set of differences between the input source code and the previous version of the input source code; determining whether the set of differences between the input source code and the previous version of the input source code satisfies a threshold; and responsive to determining that the set of differences does not the threshold, bypassing performing an additional set of compilation passes of the first internal representation component.

Example 27 is a system comprising: a memory; and a processing device operatively coupled to the memory, the processing device to: receive, by the processing device executing a compilation workflow for a target hardware architecture, an input source code associated with a configuration for the target hardware architecture; retrieve a first configuration information generated by a previous execution of the compilation workflow, wherein the first configuration information is associated with at least a portion of the configuration for the target hardware architecture; perform a first set of compilation passes of the input source code in view of the first configuration information from the previous execution of the compilation workflow; generate, in view of the first set of compilation passes of the input source code, a first internal representation component for the target hardware architecture; and generate, in view of the first internal representation component, a binary bitstream component for the target hardware architecture.

Example 28 is the system of Example 27, wherein the configuration information comprises an algorithmic representation of a functionality provided by the first internal representation component, the processing device further to: determine a performance metric associated with the algorithmic representation of the functionality in the configuration information in view of the target hardware architecture; and responsive to determining that the performance metric satisfies a threshold, perform a second set of compilation passes of the first internal representation component in view of at least one of the first configuration information or the second configuration information.

Example 29 is the system of Example 27, wherein the configuration information comprises an algorithmic representation of a functionality provided by the first internal representation component, the processing device further to: determine a performance metric associated with the algorithmic representation of the functionality in the configuration information in view of the target hardware architecture; and responsive to determining that the performance metric does not satisfy a threshold, bypass performing an additional set of compilation passes of the first internal representation component.

Example 30 is the system of Example 27, wherein the configuration information comprises information associated with a previous version of the input source code.

Example 31 is the system of Example 30, the processing device further to: determine a set of differences between the input source code and the previous version of the input source code; determine whether the set of differences between the input source code and the previous version of the input source code satisfies a threshold; and responsive to determining that the set of differences satisfies the threshold, perform an additional set of compilation passes of the input source code.

Example 32 is the system of Example 30, the processing device further to: determine a set of differences between the input source code and the previous version of the input source code; determine whether the set of differences between the input source code and the previous version of the input source code satisfies a threshold; and responsive to determining that the set of differences does not the threshold, bypass performing an additional set of compilation passes of the first internal representation component.

Example 33 is a non-transitory computer-readable media storing instructions that, when executed, cause a processing device to: receive, by the processing device executing a compilation workflow for a target hardware architecture, an input source code associated with a configuration for the target hardware architecture; retrieve a first configuration information generated by a previous execution of the compilation workflow, wherein the first configuration information is associated with at least a portion of the configuration for the target hardware architecture; perform a first set of compilation passes of the input source code in view of the first configuration information from the previous execution of the compilation workflow; generate, in view of the first set of compilation passes of the input source code, a first internal representation component for the target hardware architecture; and generate, in view of the first internal representation component, a binary bitstream component for the target hardware architecture.

Example 34 is the non-transitory computer-readable media of Example 33, wherein the configuration information comprises an algorithmic representation of a functionality provided by the first internal representation component, the processing device further to: determine a performance metric associated with the algorithmic representation of the functionality in the configuration information in view of the target hardware architecture; and responsive to determining that the performance metric satisfies a threshold, perform a second set of compilation passes of the first internal representation component in view of at least one of the first configuration information or the second configuration information.

Example 35 is the non-transitory computer-readable media of Example 33, wherein the configuration information comprises an algorithmic representation of a functionality provided by the first internal representation component, the processing device further to: determine a performance metric associated with the algorithmic representation of the functionality in the configuration information in view of the target hardware architecture; and responsive to determining that the performance metric does not satisfy a threshold, bypass performing an additional set of compilation passes of the first internal representation component.

Example 36 is the non-transitory computer-readable media of Example 33, wherein the configuration information comprises information associated with a previous version of the input source code.

Example 37 is the non-transitory computer-readable media of Example 36, the processing device further to: determine a set of differences between the input source code and the previous version of the input source code; determine whether the set of differences between the input source code and the previous version of the input source code satisfies a threshold; and responsive to determining that the set of differences satisfies the threshold, perform an additional set of compilation passes of the input source code.

Example 38 is the non-transitory computer-readable media of Example 36, the processing device further to: determine a set of differences between the input source code and the previous version of the input source code; determine whether the set of differences between the input source code and the previous version of the input source code satisfies a threshold; and responsive to determining that the set of differences does not the threshold, bypass performing an additional set of compilation passes of the first internal representation component.

Example 39 is an apparatus comprising: a means to receive, by a processing device executing a compilation workflow for a target hardware architecture, an input source code associated with a configuration for the target hardware architecture; a means to identify a first configuration information associated with at least a portion of the configuration for the target hardware architecture; a means to perform a first set of compilation passes of the input source code in view of the first configuration information; a means to generate, in view of the first set of compilation passes of the input source code, a first internal representation component for the target hardware architecture; and a means to generate, in view of the first internal representation component, a binary bitstream component for the target hardware architecture.

What is claimed is:

1. A method comprising:
    receiving, by a processing device executing a compilation workflow for a target hardware architecture, an input source code associated with a configuration for the target hardware architecture;
    identifying a first configuration information associated with at least a portion of the configuration for the target hardware architecture;
    performing a first set of compilation passes of the input source code in view of the first configuration information;
    generating, in view of the first set of compilation passes of the input source code, a first internal representation component for the target hardware architecture; and
    generating, in view of the first internal representation component, a binary bitstream component for the target hardware architecture.

2. The method of claim 1, further comprising:
    generating, in view of the first set of compilation passes, a second configuration information associated with at least an additional portion of the configuration for the target hardware architecture.

3. The method of claim 2, further comprising:
    performing a second set of compilation passes of the first internal representation component in view of at least one of the first configuration information or the second configuration information; and
    generating, in view of the second set of compilation passes of the first internal representation component, a second internal representation component for the target hardware architecture.

4. The method of claim 2, wherein the second configuration information comprises an algorithmic representation of a functionality provided by the first internal representation component, the method further comprising:
    determining a performance metric associated with the algorithmic representation of the functionality in the second configuration information in view of the target hardware architecture; and
    responsive to determining that the performance metric satisfies a threshold, performing a second set of compilation passes of the first internal representation component in view of at least one of the first configuration information or the second configuration information.

5. The method of claim 2, wherein the second configuration information comprises an algorithmic representation of a functionality provided by the first internal representation component, the method further comprising:
    determining a performance metric associated with the algorithmic representation of the functionality in the second configuration information in view of the target hardware architecture; and
    responsive to determining that the performance metric does not satisfy a threshold, bypassing performing an additional set of compilation passes of the first internal representation component.

6. The method of claim 1, wherein the first configuration information comprises an algorithmic representation of a functionality associated with the target hardware configuration.

7. The method of claim 1, wherein the first configuration information comprises data representing a machine learning model trained to perform at least one of determining whether to identify an additional configuration information, or determining a number of compilation passes in the set of compilation passes.

8. A system comprising:
    a memory; and
    a processing device operatively coupled to the memory, the processing device to:
        receive, using a compilation workflow for a target hardware architecture, an input source code associated with a configuration for the target hardware architecture;
        retrieve a first configuration information generated by a previous execution of the compilation workflow, wherein the first configuration information is associated with at least a portion of the configuration for the target hardware architecture;
        perform a first set of compilation passes of the input source code in view of the first configuration information from the previous execution of the compilation workflow;
        generate, in view of the first set of compilation passes of the input source code, a first internal representation component for the target hardware architecture; and
        generate, in view of the first internal representation component, a binary bitstream component for the target hardware architecture.

9. The system of claim 8, wherein the configuration information comprises an algorithmic representation of a functionality provided by the first internal representation component, the processing device further to:
    determine a performance metric associated with the algorithmic representation of the functionality in the configuration information in view of the target hardware architecture; and
    responsive to determining that the performance metric satisfies a threshold, perform a second set of compilation passes of the first internal representation component in view of at least one of the first configuration information or the second configuration information.

10. The system of claim 8, wherein the configuration information comprises an algorithmic representation of a functionality provided by the first internal representation component, the processing device further to:
  determine a performance metric associated with the algorithmic representation of the functionality in the configuration information in view of the target hardware architecture; and
  responsive to determining that the performance metric does not satisfy a threshold, bypass performing an additional set of compilation passes of the first internal representation component.

11. The system of claim 8, wherein the configuration information comprises information associated with a previous version of the input source code.

12. The system of claim 11, wherein the processing device is further to:
  determine a set of differences between the input source code and the previous version of the input source code;
  determine whether the set of differences between the input source code and the previous version of the input source code satisfies a threshold; and
  responsive to determining that the set of differences satisfies the threshold, perform an additional set of compilation passes of the input source code.

13. The system of claim 11, wherein the processing device is further to:
  determine a set of differences between the input source code and the previous version of the input source code;
  determine whether the set of differences between the input source code and the previous version of the input source code satisfies a threshold; and
  responsive to determining that the set of differences does not the threshold, bypass performing an additional set of compilation passes of the first internal representation component.

14. A non-transitory computer-readable media storing instructions that, when executed, cause a processing device to:
  receive an input source code associated with a configuration for a target hardware architecture;
  identify a first configuration information associated with at least a portion of the configuration for the target hardware architecture;
  perform a first set of compilation passes of the input source code in view of the first configuration information;
  generate, in view of the first set of compilation passes of the input source code, a first internal representation component for the target hardware architecture; and
  generate, in view of the first internal representation component, a binary bitstream component for the target hardware architecture.

15. The non-transitory computer-readable media of claim 14, wherein the processing device is further to:
  generate, in view of the first set of compilation passes, a second configuration information associated with at least an additional portion of the configuration for the target hardware architecture.

16. The non-transitory computer-readable media of claim 15, wherein the processing device is further to:
  perform a second set of compilation passes of the first internal representation component in view of at least one of the first configuration information or the second configuration information; and
  generate, in view of the second set of compilation passes of the first internal representation component, a second internal representation component for the target hardware architecture.

17. The non-transitory computer-readable media of claim 15, wherein the second configuration information comprises an algorithmic representation of a functionality provided by the first internal representation component, and wherein the processing device is further to:
  determine a performance metric associated with the algorithmic representation of the functionality in the second configuration information in view of the target hardware architecture; and
  responsive to determining that the performance metric satisfies a threshold, perform a second set of compilation passes of the first internal representation component in view of at least one of the first configuration information or the second configuration information.

18. The non-transitory computer-readable media of claim 15, wherein the second configuration information comprises an algorithmic representation of a functionality provided by the first internal representation component, and wherein the processing device is further to:
  determine a performance metric associated with the algorithmic representation of the functionality in the second configuration information in view of the target hardware architecture; and
  responsive to determining that the performance metric does not satisfy a threshold, bypass performing an additional set of compilation passes of the first internal representation component.

19. The non-transitory computer-readable media of claim 14, wherein the first configuration information comprises an algorithmic representation of a functionality associated with the target hardware configuration.

20. The non-transitory computer-readable media of claim 14, wherein the first configuration information comprises data representing a machine learning model trained to perform at least one of determining whether to identify an additional configuration information, or determining a number of compilation passes in the set of compilation passes.

* * * * *